United States Patent Office 2,946,723
Patented July 26, 1960

2,946,723

COMPOSITION CONTAINING PARA-AMINOSALI-
CYCLIC ACID AND ITS SODIUM SALT

Frank L. Root, St. Louis, Mo., assignor to Dumas-Wilson
& Co., St. Louis, Mo., a corporation of Missouri No Drawing. Filed Jan. 21, 1958, Ser. No. 710,188

9 Claims. (Cl. 167—65)

This invention relates to a new composition of matter comprising para-aminosalicylic acid and sodium para-aminosalicylate.

It is well known that para-aminosalicylic acid is effective as an antibacterial in the treatment of tuberculosis. However, the acid must be used in large doses frequently administered and over long periods of time in order to maintain therapeutically effective concentrations in the blood. These large doses frequently cause undesirable side effects to occur thereby adversely affecting the therapy of the patient of the patient being treated. When the acid is used in the large doses necessary, acidic gastric distress is common and some patients develop an intolerance for the drug and are unable to retain it. Furthermore, with some patients even a smaller dosage than normal may cause severe gastric disturbances. It has been suggested that gastric neutralisers or antacids may be combined or taken with the acid to obviate the adverse effects thereof. However, the use of such neutralisers is expensive, increases the bulk of the medicament, may render the drug unstable and in general they have not been proven to be satisfactory.

To overcome the effects caused by the use of para-aminosalicylic acid, the sodium salt thereof has been put into widespread use. It is readily obtainable and, like the acid, is stable in storage. However, sodium para-aminosalicylate must also be administered in large and frequent doses because of the rapid absorption and excretion of the drug into and from the blood. Furthermore, the sodium salt of para-aminosalicylic acid when used in the large doses necessary, upsets the normal acid balance of the stomach by increasing the pH thereof.

Other forms of para-aminosalicylic acid have been suggested for use in the treatment of tuberculosis, but none of them has been proven to obviate the disadvantages hereinbefore noted.

The invention is embodied in a composition having as its active ingredients para-aminosalicylic acid and sodium or potassium para-aminosalicylate or a combination thereof in a predetermined proportion to obviate the disadvantages of the prior art compositions. The composition is stable, does not require a neutralising agent and does not disturb the normal acid balance of the patient's stomach whereby it can be used with excellent results by most patients who have not been able to tolerate the para-aminosalicylate drugs known hereinbefore.

Para-aminosalicylic acid and its sodium salt are both readily available in substantially pure form. According to the present invention, these constituents are combined in a predetermined proportion to provide a new therapeutically effective drug for combating tuberculosis. In the presently preferred molar ratio of the active ingredient, the sodium salt comprises 86.8 mol percent and the acid comprises 13.2 mol percent. The preferred proportion has a pH of about 4.1. For the purposes of disclosure, neither the acid nor its salt is in the hydrated form.

Although a pH of 4.1 is presently preferred, it may be desired to vary the pH of the present composition between about 3.3 and 4.8 because of individual physiological variations in humans. The minimum prescribed pH of 3.3 for the active ingredient is obtained by a ratio of about 52 mol percent of sodium para-aminosalicylate and 48 mol percent of para-aminosalicylic acid. The maximum prescribed pH of 4.8 of the active ingredient is obtained by a ratio of about 97.3 mol percent of sodium para-aminosalicylate and about 2.7 mol percent of para-aminosalicylic acid.

It will be readily apparent to one skilled in the art that the ratio of the composition may be varied to provide other pH values within the range of 3.3 to 4.8.

In the present invention the potassium salt of para-aminosalicylic acid may be substituted for the sodium salt thereof in the same molar ratio as disclosed hereinbefore to provide a pH range between 3.3 and 4.8. The active ingredient including the potassium salt preferably has a pH of about 4.1. It is also within the scope of the present invention to combine the potassium and sodium salts as one of the active constituents of the composition which also includes the para-aminosalicylic acid as the other active constituent.

The invention will be more fully understood by the following specific examples of the best method of preparing the present composition; parts are by weight.

*Example No. 1*

423 grams of sodium para-aminosalicylate and 56 grams of para-aminosalicylic acid are thoroughly intermixed and granulated using isopropyl alcohol and an aqueous solution of 10% sugar and 25% acacia. The composition is then dried and screened.

*Example No. 2*

455 grams of potassium para-aminosalicylate and 56 grams of para-aminosalicylic acid are thoroughly intermixed and granulated using isopropyl alcohol and an aqueous solution of 10% sugar and 25% acacia. The composition is then dried and screened.

*Example No. 3*

212 grams of sodium para-aminosalicylate, 227 grams of potassium para-aminosalicylate and 56 grams of para-aminosalicylic acid are thoroughly intermixed and granulated using isopropyl alcohol and an aqueous solution of 10% sugar and 25% acacia. The composition is then dried and screened.

*Example No. 4*

423 grams of sodium para-aminosalicylate are granulated using isopropyl alcohol and 56 grams of para-aminosalicylic acid are granulated using isopropyl alcohol. The two are mixed thoroughly and further granulated using an aqueous solution of 10% sugar and 25% acacia. The composition is then dried and screened.

It is obvious that the active ingredients may be mixed with suitable excipients where desirable for therapeutic use. The foregoing examples are given only by way of illustration and it is to be understood that the present invention does not reside in the method of preparing the composition but in a new tuberculostatic composition having as its active ingredient para-aminosalicylic acid and either the sodium or the potassium salt of the acid or a combination of these salts.

What is claimed is:

1. A therapeutic composition consisting essentially of para-aminosalicylic acid and sodium para-aminosalicylate as the therapeutically effective ingredient.

2. A therapeutic composition consisting essentially of para-aminosalicylic acid and potassium para-aminosalicylate as the therapeutically effective ingredient.

3. A therapeutic composition consisting essentially of para-aminosalicylic acid and a salt selected from a group consisting of sodium para-aminosalicylate, potassium para-aminosalicylate and a mixture of sodium and potassium para-aminosalicylates in a predetermined proportion.

4. A therapeutic composition consisting essentially of para-aminosalicylic acid and a salt selected from a group consisting of sodium para-aminosalicylate, potassium para-aminosalicylate and a mixture of sodium and potassium para-aminosalicylate, the composition having a pH of about 3.3 to 4.8.

5. A therapeutic composition for the treatment of tuberculosis consisting essentially of para-aminosalicylic acid and a salt selected from a group consisting of sodium para-aminosalicylate, potassium para-aminosalicylate and a mixture of sodium and potassium para-aminosalicylate, the composition having a pH of about 4.1.

6. A therapeutic composition for the treatment of tuberculosis consisting essentially of about 48 mol percent to 2.7 mol percent of para-aminosalicylic acid and about 52 mol percent to 97.3 mol percent of a salt of said acid selected from a group consisting of sodium, potassium and a mixture of sodium and potassium.

7. A tuberculostatic composition consisting essentially of about 48 mol percent to 2.7 mol percent of para-aminosalicylic acid and about 52 mol percent to 97.3 mol percent of sodium para-aminosalicylate.

8. A tuberculostatic composition having an active ingredient consisting essentially of about 13.2 mol percent of para-aminosalicylic acid and about 86.8 mol percent of sodium para-aminosalicylate.

9. A solid composition as an antibacterial for the treatment of tuberculosis having an active ingredient consisting essentially of para-aminosalicylic acid and sodium para-aminosalicylate which in aqueous solution has a pH of about 4.1, the composition being adapted to be utilized without adversely affecting the normal acid concentration of the stomach.

References Cited in the file of this patent

UNITED STATES PATENTS 2,611,732     German et al.  ---------- Sept. 23, 1952